United States Patent [19]
Nishimura et al.

[11] Patent Number: 4,585,691
[45] Date of Patent: Apr. 29, 1986

[54] FRICTION MATERIAL WITH FLAME SPRAYED METAL COATING

[75] Inventors: Akira Nishimura; Kazuaki Kawasaki; Yasuo Nakano; Hiromichi Horie; Hiroshi Ushiyama; Mikio Manabe, all of Hitachi; Hikaru Maeyama, Ibaraki; Saburo Abe, Atsugi; Masakazu Tambara, Hamamatsu; Yuji Takahashi, Tokorozawa; Yasuo Katagiri, Hadano, all of Japan

[73] Assignees: Hitachi Chemical Co., Ltd.; Nissan Motor Co., Ltd.; Atusgi Motor Parts Co., Ltd., all of Tokyo, Japan

[21] Appl. No.: 439,197

[22] Filed: Nov. 4, 1982

[30] Foreign Application Priority Data

Nov. 6, 1981 [JP] Japan ................................. 56-178772

[51] Int. Cl.[4] .......................... B05B 7/20; B32B 19/04
[52] U.S. Cl. .............................. 428/311.1; 428/318.4; 428/340; 428/341; 428/342; 428/409; 428/444; 428/458; 428/464
[58] Field of Search ............... 428/443, 444, 458, 464, 428/340, 341, 342, 457, 311.1, 318.4, 409; 427/423

[56] References Cited

U.S. PATENT DOCUMENTS 1,757,408  5/1930  Boegehold et al. ............... 427/383.3
3,759,739  9/1973  Varlas ................................. 427/423

FOREIGN PATENT DOCUMENTS 198597  3/1920  Canada ................................ 428/444

Primary Examiner—Marion E. McCamish
Attorney, Agent, or Firm—Antonelli, Terry & Wands

[57] ABSTRACT

A friction material obtained by flame spraying a metal which can be a sacrificial anode for iron on the surface of a friction material substrate in an amount of 0.5 to 8.0 mg/cm$^2$ shows excellent resistance to judder and excellent rust prevention.

7 Claims, No Drawings

FRICTION MATERIAL WITH FLAME SPRAYED METAL COATING

This invention relates to a friction material such as clutch facing, disc pad, brake lining, and the like.

The above-mentioned friction materials, particularly clutch facing, are required to have excellent prevention of vibration at the time of start and acceleration and resistance to judder as well as stability in friction properties and resistance to wear. Recently, to have excellent resistance to judder becomes a particularly important property for friction materials. On the other hand, when a car is not driven for a long time, the clutch facing sticks to the flywheel or pressure plate. Even in such a state, it is required not to produce rust between the clutch facing and the opposite material (the flywheel, pressure plate and the like) and to make it possible to operate the clutch smoothly during driving. But cars are kept in custody for a long time in a depository or a ship for export before these are handed to users after the production. During such a period, there is sometimes produced rust between the clutch facing and the opposite material, which results in making it difficult to operate the clutch.

The present inventors have examined causes of producing the rust and found that the first cause is trace amounts of chlorine ions and sulfate ions included in the starting material of the clutch facing. The second cause is that the clutch facing is made in low density, soft and porous in order to impart properties wherein resistance to judder is most improtant, so that the clutch facing absorbs moisture from the atmosphere.

In order to prevent the rust, the clutch facing is dipped in an aqueous solution containing sodium nitrite as a major component and dried. But when a friction material is acid, sodium nitrite is decomposed and consumed to reduce the effect remarkably. It is also proposed to treat the surface of the opposite material with zinc phosphate or manganese phosphate so as to prevent the rust, but such a process is not suitable for industrial applications from the economical point of view.

The present inventors have studied various processes for preventing friction materials from causing rust without removing chlorine ions and sulfate ions present in starting materials therefrom and accomplished this invention.

This invention provides a friction material obtained by flame spraying a metal which can be a sacrificial anode for iron on the surface of a friction material substrate in an amount of 0.5 mg/cm$^2$ to 8.0 mg/cm$^2$.

The metal which can be a sacrificial anode for iron means a metal which can be an anode in place of iron when said metal is present together with iron and which can prevent the iron from rusting, in electrochemical mechanism of rusting. Examples of such sacrificial metals are zinc, aluminum, magnesium alloys, and the like. These metals can be used alone or as a mixture thereof. These metals can be used in the form of linear solid or powder.

The metal which can be a sacrificial anode for iron should be flame sprayed on the surface of a friction material substrate and adhered thereto. Flame spraying conditions are not limited and conventional conditions can be employed.

The metal which can be a sacrificial anode for iron is flame sprayed on the surface of the friction material substrate in an amount of 0.5 to 8.0 mg/cm$^2$. If the amount is less than 0.5 mg/cm$^2$, the rust prevention effect becomes little, while if the amount is more than 8.0 mg/cm$^2$, the resistance to judder is lowered.

As the friction material substrate, there can be used conventional ones obtained from a mixture comprising a fibrous material such as asbestos, glass fibers, ceramic fibers, spun rayon, etc., or a mixture thereof; a wear resistant powder such as cashew nut shell oil powder, rubber particles, cork powder, wood powder etc., or a mixture thereof; and as a binder a thermosetting resin such as a phenolic resin, melamine resin, etc., or a mixture thereof; and if necessary, a metal powder or metal line. It is preferable to use friction material substrates having a porosity of 5 to 30%. In order to prevent the metal which can be a sacrificial anode for iron from peeling, it is preferable to use friction material substrates having surface roughness of 20 to 100 μm.

This invention is illustrated by way of the following Examples, in which all parts and percents are by weight unless otherwise specified.

EXAMPLES

85 Parts of 4K class asbestos (mfd. by Carey Co.) and 15 parts of spun rayon (mfd. by Toho Rayon Co., Ltd.) were mixed uniformly and formed into asbestos web by using a carding machine. After dispersing 18 parts of wear resistant powder of heat cured material obtained from cashew nut shell oil (FF 1800, a trade name, mfd. by Tohoku Kako K.K.) in 82 parts of the asbestos web, the resulting asbestos web is treated using a condenser to give asbestos sliver containing wear resistant powder. The asbestos sliver is twisted by using a spinning frame to give a single yarn having a diameter of 1 mm. Then, the resulting two single yarns and one brass line having a diameter of 0.16 mm were twisted to give asbestos yarn containing wear resistant powder with a weight of 2.5 g/m.

Coated yarn was obtained by impregnating the wear resistant powder-containing asbestos yarn with a melamine modified phenol-formaldehyde resin (mfd. by Dainippon Ink and Chemicals, Inc.) in an amount of 20% based on the weight of the coated yarn.

The coated yarn was preformed into a tablet in the form of a clutch facing, followed by molding with heating at 150±5° C. under a pressure of 300 kg/cm$^2$ for 8 minutes. Then the surface of the molded product was polished and heat treated at 200° C. for 8 hours, followed by polishing of the surface to produce the clutch facing having a diameter of 200 mm and having the form designed in a drawing.

A zinc line having a purity of 95% (KR-5, a trade name, mfd. by Kato Metalicon Kogyo K. K.) was melted and flame sprayed on the surface (183 cm$^2$) of the clutch facing at a voltage of 15 V, a current of 20 A and an air pressure of 5 kg/cm$^2$ for 5 minutes to give a zinc coating of 0.5 mg/cm$^2$. Similarly, zinc coatings of 5.0 mg/cm$^2$ and 8.0 mg/cm$^2$ were obtained by conducting the flame spraying for 25 and 50 seconds. The zinc coated clutch facings thus obtained were subjected to tests for rust resistance and judder resistance.

A combination of a flywheel practically usable in a car, a clutch disc pasted with each clutch facing thus obtained and a clutch cover was placed in a room at a constant temperature of 50° C. and a constant moisture of 95% RH for 3 days, followed by drying in air for 24 hours.

As a result, almost no rust was produced at the friction surface and the judder resistance was also excellent in each case.

In order to know a rust prevention effect of flame spraying of zinc on other friction materials, a specially processed woven facing obtained by impregnating asbestos yarns containing a wear resistance powder with a thermosetting resin such as a phenolic resin, melamine resin or the like, winding in spiral state and curing the resin; a semimold facing obtained by coating a mixture of a rubber such as styrene-butadiene rubber, nitrile-butadiene rubber, or the like and an inorganic powder such as alumina, silica, magnesium carbonate, or the like on the surface of asbestos yarns containing a wear resistant powder, followed by heating and curing; and a resin mold facing obtained by mixing asbestos short fibers, a wear resistant powder and a metal powder with a thermosetting resin such as a phenolic resin, melamine resin, or the like, followed by heating and curing, were used as substrate and also flame sprayed with zinc and the same tests as mentioned above were conducted. The flame spraying conditions were a voltage of 15 V, a current of 20 A, an air pressure of 5 kg/cm$^2$ and a flame spraying time of 5 seconds. Thus, each zinc coating of 0.5 mg/cm$^2$ was obtained. No rust was produced in each case. Thus, it was confirmed that the flame spraying of zinc is effective for preventing each clutch facing from rust.

The same effect as mentioned above is obtained when this invention is applied to disk pads, brake linings and the like friction materials other than the clutch facing.

As mentioned above, friction materials such as clutch facing, disk pad, brake linking, etc., excellent in resistance to judder, and smooth in operating clutch even if a car is not drived for a long period of time can be obtained according to this invention with low cost and without changing friction properties.

What is claimed is:

1. A friction material for preventing the occurrence of rust of an associated iron-containing contact surface, said friction material comprising a friction material substrate and a metal coating obtained by flame spraying a metal which will provide a sacrificial anode for iron on the surface of the friction material substrate in an amount of 0.5 mg/cm$^2$ to 8.0 mg/cm$^2$; said metal being selected from the group consisting of zinc, aluminum, a magnesium alloy and a mixture thereof and said friction material substrate being obtained by molding with heating under pressure a mixture consisting essentially of at least one fibrous material selected from the group consisting of asbestos, glass fibers, ceramic fibers and spun rayon, at least one wear resistant powder selected from the group consisting of cashew nut shell oil powder, rubber particles, cork powder and wood powder, and a thermosetting resin as a binder.

2. A friction material according to claim 1, wherein the friction material substrate has a porosity of 5 to 30%.

3. A friction material according to claim 2, wherein the friction material substrate has a surface roughness of 20 to 100 μm.

4. A friction material according to claim 1, wherein said said thermosetting resin is at least one member selected from the group consisting of a phenolic resin and a melamine resin.

5. A friction material according to claim 1, wherein the metal coating is obtained by flame sparying zinc.

6. A friction material according to claim 1, wherein the metal coating is obtained by flame spraying aluminum.

7. A friction material according to claim 1, wherein the metal coating is obtained by flame spraying a magnesium alloy.

* * * * *